L. STOTTMEISTER.
VEHICLE SIGNAL DEVICE.
APPLICATION FILED JULY 22, 1920.

1,365,744.

Patented Jan. 18, 1921.
2 SHEETS—SHEET 1.

Inventor
Louis Stottmeister
By his Attorney
Paul M. Klein

L. STOTTMEISTER.
VEHICLE SIGNAL DEVICE.
APPLICATION FILED JULY 22, 1920.
1,365,744.
Patented Jan. 18, 1921.
2 SHEETS—SHEET 2.
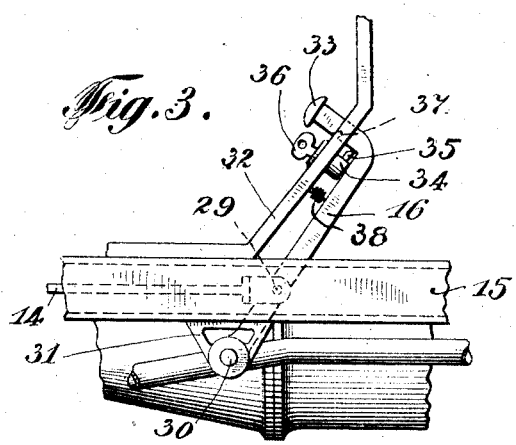
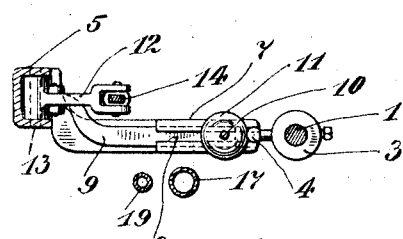
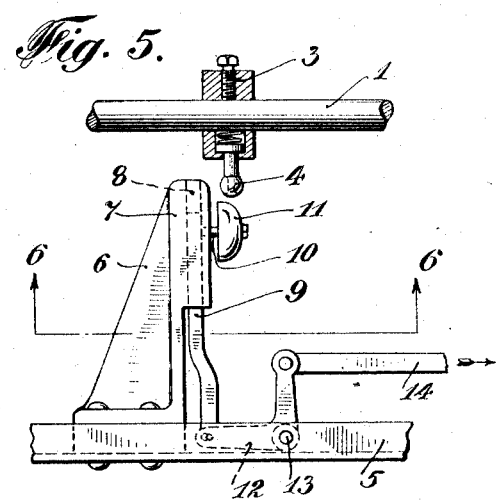
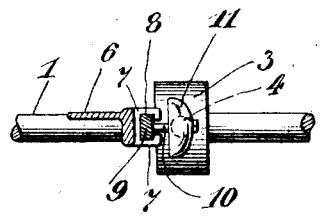
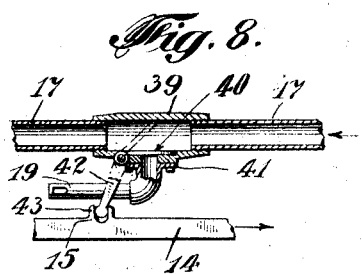
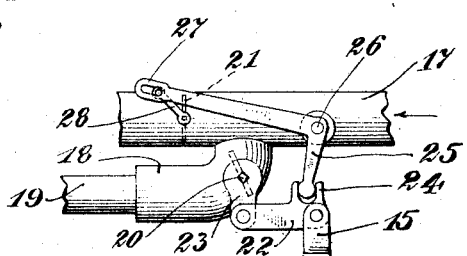
Inventor
Louis Stottmeister
By his Attorney
Paul M. Klein

UNITED STATES PATENT OFFICE.

LOUIS STOTTMEISTER, OF NEW YORK, N. Y.

VEHICLE SIGNAL DEVICE.

1,365,744.     Specification of Letters Patent.     Patented Jan. 18, 1921.

Application filed July 22, 1920. Serial No. 398,100.

*To all whom it may concern:*

Be it known that I, LOUIS STOTTMEISTER, a citizen of the United States, and resident of New York, in the county of New York and State of New York, have invented certain new and useful Improvements in Vehicle Signal Devices, of which the following is a specification.

This invention relates to vehicle signal devices in general, and particularly to the kind giving an audible alarm.

The primary objects of my invention are to provide means whereby an attempted theft of a vehicle, as for instance an automobile, may be not only readily detected at the moment the unauthorized person starts the motor going, but also means for emitting an additional alarm, provided the thief was not caught at his first act, when the vehicle starts moving.

Another object of my invention is to provide with such alarm giving means auxiliary operating devices facilitating said alarms to be put in operative position when desired or to be made inoperative when the owner drives the vehicle.

A further object of my invention is to provide locking means for keeping said auxiliary operating devices, and thereby the alarms, in operative position when the owner leaves the vehicle.

The foregoing and still other objects will be more fully understood from the following description and the accompanying drawings showing preferred embodiments of my invention and forming part of this specification.

In the drawings—

Fig. 3 illustrates the operating lever in unlocked position.

Fig. 4 is a sectional view taken on line 4—4 of Fig. 1.

Fig. 5 is a detail view of my bell alarm in inoperative position.

Fig. 6 is a cross sectional view taken on line 6—6 of Fig. 5.

Fig. 7 is a detail view of my whistle alarm.

Fig. 8 represents a modified construction of my whistle alarm.

Figure 1:
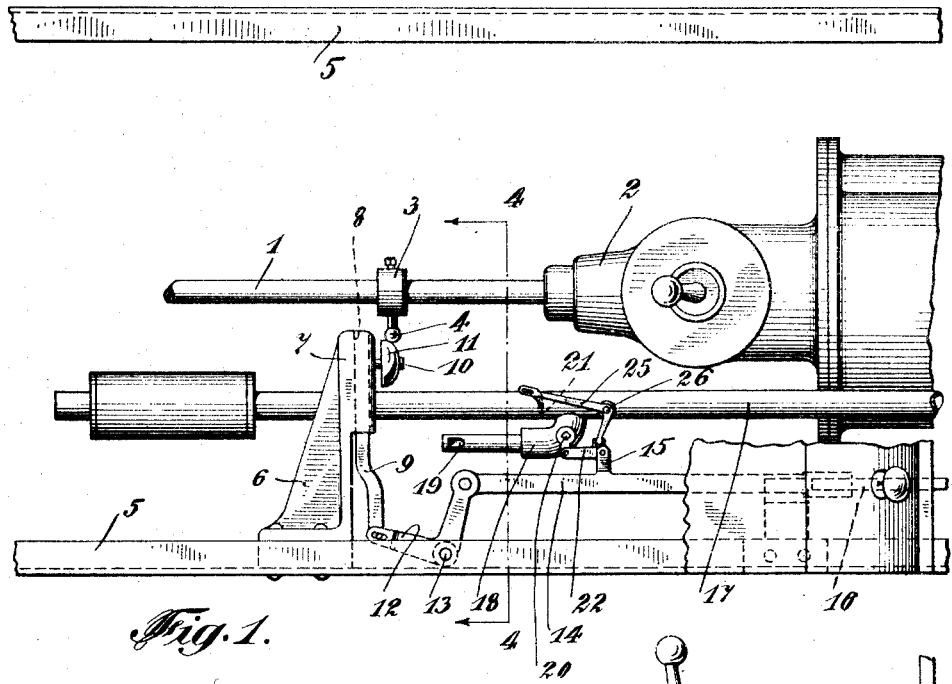
Figure 1 represents a plan view of a part of an automobile equipped with my alarm devices.
Figure 2:
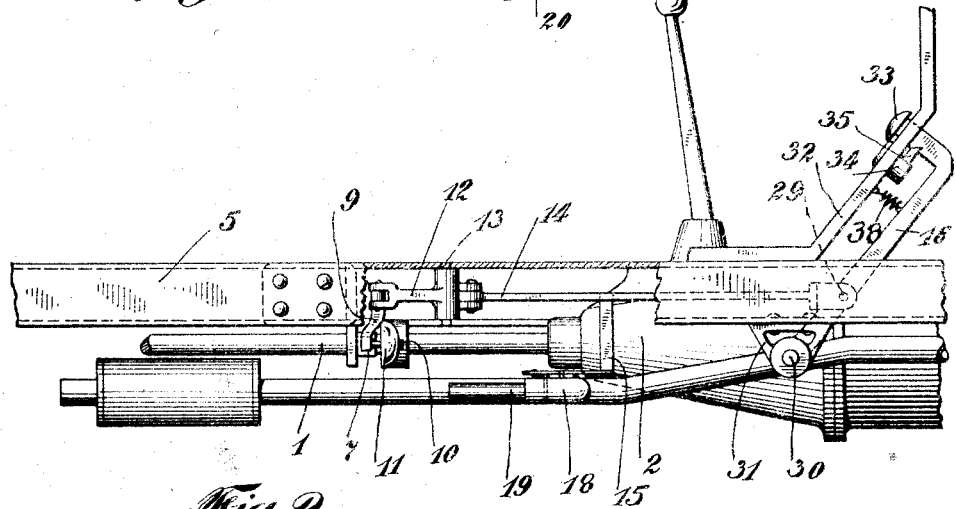
Fig. 2 is side elevation thereof.

Referring to the drawings, the numeral 1 indicates the driving shaft issuing from the gear box 2 of conventional construction. Fixedly attached upon the shaft is a collar 3, and extending therefrom is a bell hammer 4. Since the driving shaft rotates, the collar and the hammer are caused to revolve with the shaft.

Bolted or otherwise fastened to the vehicle frame 5 is a stationary bracket 6 provided with an enlarged end portion 7 which possesses a channel-shaped guide recess 8. (Compare Figs. 1, 5 and 6.) In this guide reciprocates a slide 9 having near its guided end a pin 10 to which a bell 11 is attached. The bell may be moved into the path of the revolving hammer 4 or may be withdrawn from the hammer by bell crank 12 pivoted at 13 in frame 5. The bell crank is operated by a connecting bar 14 having an extension 15 and connected with foot operated lever 16.

Branching out from the exhaust pipe 17 is a pipe connection 18 terminating in a whistle 19.

A whistle valve indicated at 20 is provided in pipe connection 18, while another valve 21 is placed in the exhaust pipe 17. Both valves coöperate in such a manner that when valve 20 is closed, valve 21 is opened and vice versa.

Both valves are operated simultaneously with the bell 11. When the bell is moved toward the hammer, valve 20 is opened and valve 21 is closed, whereby the exhausted gases issuing from the engine of the vehicle are forced to pass through the whistle.

When the bell is withdrawn from the hammer, the whistle valve is closed and the exhaust is opened.

The operation of the valves is caused by connecting bar 14 through extension 15 to which a lever 22 is pivotedly attached at one end and to valve lever 23 at the other end. (See Fig. 7).

At the end connected with extension 15 lever 22 is provided with a yoke 24 by which the rounded and shorter end of bell crank 25 is engaged. Bell crank 25 is pivotedly held at 26 on top of exhaust pipe 17. Its longer end is provided with a slotted portion 27 by way of which valve lever 28 of exhaust valve 21 is operated.

Connecting bar 14 is attached at 29 to foot lever 16 which oscillates at 30 representing a pin in bracket 31 permanently attached to frame 5.

Operating lever 16 is preferably placed beneath the foot board 32 of the vehicle and is provided with a pedal 33 for conveniently pressing it down.

Embedded in the foot board and securely fastened thereto is a conventional lock 34 having a snap-bar 35 protruding from its body and adapted to be held permanently in its protruding position when key 36 is removed from the lock.

Registering with that snap-bar a notch or other suitable means 37 are provided on lever 16 causing the latter to remain in downward or operative position when engaged by the bar.

A tension spring 38 attached at one end to the foot board and at its other end to lever 16 (Fig. 3) tends to keep the latter normally in upward or inoperative position.

In Fig. 8 a modified construction of the whistle arrangement is shown whereby but one valve member is employed for both closing the exhaust pipe and opening the whistle connection, and simultaneously directing the exhaust gases into the latter.

In this case the exhaust pipe 17 is intercepted by a valve housing 39 provided with a flap valve 40 adapted to swing inward as indicated in dashed lines. The whistle pipe connection 18 is provided in this case with flange 41 attached to housing 39.

The valve is operated by lever 42 actuated by connecting bar 14, the extension 15 of which is provided with a yoke 43 similar to yoke 24 of the construction shown in Fig. 7.

The flap valve 40 is normally held in position shown in full lines by connecting bar 14, and in order to assure the valve remaining in this normal position, a spring or other means may be arranged to hold it flat against the wall of the valve housing independently.

Operation:

When lever 16 is pushed down, connecting bar 14 travels forward and causes the bell to move into the path of the hammer, while the exhaust gases are directed into the whistle. By removing the key from the lock lever 16 the two alarms remain in operative position.

When an unauthorized person attempts to steal the vehicle, relying upon its own propelling power and starts the motor, the whistle will sound an alarm. When propelling the vehicle without its own power the bell will ring. When removing the car by its own energy both alarms will become audible.

Thus it will be observed from the above that my alarm system is effective and efficient for the purposes to which it is put.

Be it understood that while I have shown and described a particular and specific construction of my invention, changes, improvements and additions may be made within and without departing from the broad scope of my invention.

I claim:

1. In an alarm device for vehicles, including a bell and a whistle, the combination with a foot operated lever, means for normally holding it in inoperative position, locking means for keeping the lever in operative position when desired, a connecting bar attached to said lever and having an extension, a stationary bracket having a guide groove, a slide bar guided therein, a bell carrying pin provided at one end of said slide bar, a bell crank connecting said slide bar with said connecting bar, a collar having a bell hammer fixedly attached to driving shaft of a vehicle, a whistle attached to the exhaust of said vehicle, a valve provided in said whistle, another valve provided in said exhaust, operating levers connected with said bar extension, said bell adapted to move toward said hammer, said whistle valve adapted to open and said exhaust valve adapted to close when said foot lever is pressed down and is engaged by said locking means.

2. A vehicle alarm for emitting bell and whistle sounds when operated by unauthorized persons, comprising in combination, a bell hammer fixedly attached to the driving shaft of a vehicle, a bracket having a guide recess, a slide movably mounted therein, a bell attached to said slide and adapted to move toward and from said hammer, a whistle connected with the engine exhaust pipe of said vehicle, a valve adapted to close or open the passage to said whistle, another valve provided in the exhaust pipe and adapted to be closed when said whistle valve is open, and to be open when said whistle valve is closed, a foot operated lock controlled lever adapted to move said bell in the path of said hammer and simultaneously open the whistle valve and close the exhaust valve when the lever is set into operative position, and means for keeping said lever normally in inoperative position substantially as described.

3. In an audible alarm for vehicles, the combination with a driving shaft and an exhaust pipe, a hammer attached to said shaft and adapted to revolve therewith, a slidably mounted bell adapted to move to and from the path of said hammer, a whistle attached to said pipe, valve members adapted to operate simultaneously with said bell and so arranged as to direct the exhaust gases through the whistle when said bell moves toward said hammer, a lever combination facilitating the simultaneous operation of the bell and the valve members from the driver's seat, locking means for keeping said lever combination in operative position when desired, and means for normally holding said lever combination in inoperative position when not engaged by said locking means.

4. A vehicle alarm for emanating bell and whistle sounds when an unauthorized person attempts to operate the vehicle, comprising in combination, a whistle attached to the exhaust pipe of the vehicle, valve means adapted to deflect the normal flow of exhaust gases passing through the exhaust pipe into said whistle, a bell hammer attached to the driving shaft in rear of the gear box of the vehicle and adapted to revolve with the shaft, a slidably mounted bell adapted to move into the path of said revolving hammer, means for operating said valve means and said bell simultaneously from the driver's seat, and means for keeping said operating means in operative position when desired.

5. A vehicle alarm, comprising in combination, a whistle connected with the exhaust pipe of the vehicle, a bell slidably fixed near the driving shaft thereof, a hammer connected with that shaft, means for directing exhaust gases to pass through and sound said whistle, means for sliding the bell into contacting position with said hammer, and means for simultaneously causing said whistle and said bell to be in operative position when desired.

6. A double alarm for vehicles, one adapted to become audible when the motor of the vehicle is started by an unauthorized person, the other adapted to become audible when the vehicle is moved, comprising in combination, a whistle operable by the exhaust gases of the vehicle engine, a slidably mounted bell adapted to be sounded when the driving shaft of the vehicle is in motion, operating means for causing simultaneously both the whistle and the bell to become operative when the vehicle is tampered with, and means for keeping said operating means in alarm causing position, when desired.

7. In an alarm system, for motor vehicles provided with an exhaust pipe, made operable through a foot operated lever attached to said vehicle the combination of a bell attached to said lever through intermediate leverage means, means for facilitating the vertical motion of said bell, means for sounding said bell when desired, a whistle connected to said exhaust pipe and made operable by the exhaust gases passing through said pipe, valve means connected to said lever and made operable in said exhaust pipe and said whistle, the operation of said valve means being such that when the motor of said vehicle is in action and the exhaust pipe closed the said whistle sounds, and means for operating said valve through said foot lever, substantially as described.

Signed at New York, in the county of New York, and State of New York, this 20th day of July A. D. 1920.

LOUIS STOTTMEISTER.